United States Patent
Vandervort et al.

(10) Patent No.: US 6,452,294 B1
(45) Date of Patent: Sep. 17, 2002

(54) GENERATOR ENDWINDING COOLING ENHANCEMENT

(75) Inventors: Christian Lee Vandervort, Voorheesville, NY (US); Todd Garrett Wetzel, Niskayuna, NY (US); Emil Donald Jarczynski, Scotia, NY (US); Samir Armando Salamah, Niskayuna, NY (US); Wayne Nigel Owen Turnbull, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/739,360

(22) Filed: Dec. 19, 2000

(51) Int. Cl.[7] .............................. H02K 1/32; H02K 3/24; H02K 5/18; H02K 5/20; H02K 9/00; H02K 9/06; H02K 3/46

(52) U.S. Cl. ............................. 310/64; 310/61; 310/270

(58) Field of Search ........................ 310/61, 64, 65, 310/270

(56) References Cited

U.S. PATENT DOCUMENTS

| | | | | |
|---|---|---|---|---|
| 1,927,890 A | * | 9/1933 | Fechheimer | 310/61 |
| 2,653,255 A | * | 9/1953 | Baudry et al. | 122/182.1 |
| 2,661,434 A | * | 12/1953 | Kilbourne | 174/16.1 |
| 2,724,064 A | * | 11/1955 | Kilner | 310/61 |
| 2,786,951 A | * | 3/1957 | Morgan | 310/61 |
| 2,796,540 A | * | 6/1957 | Barlow | 310/270 |
| 2,833,944 A | * | 5/1958 | Willyoung | 310/61 |
| 2,844,746 A | * | 7/1958 | Coggeshall | 310/270 |
| 2,904,708 A | * | 9/1959 | Willyoung | 310/64 |
| 3,005,119 A | * | 10/1961 | Schmitt et al. | 310/262 |
| 3,225,231 A | * | 12/1965 | Kudlacik | 310/59 |
| 4,071,790 A | * | 1/1978 | Darby et al. | 310/59 |
| 4,141,669 A | * | 2/1979 | Darby et al. | 310/59 |
| 4,301,386 A | * | 11/1981 | Schweder et al. | 310/216 |
| 4,335,324 A | * | 6/1982 | Fujioka et al. | 310/59 |
| 4,415,822 A | * | 11/1983 | Aiba | 310/59 |
| 4,543,503 A | * | 9/1985 | Kaminski et al. | 310/270 |
| 2,920,219 A | | 1/1990 | Beckwith et al. | 310/55 |
| 4,922,147 A | * | 5/1990 | Sismour et al. | 310/53 |
| 5,281,877 A | * | 1/1994 | Kazmierczak et al. | 310/59 |
| 5,644,179 A | * | 7/1997 | Staub et al. | 310/65 |
| 5,685,063 A | | 11/1997 | Prole et al. | 29/598 |
| 6,204,580 B1 | * | 3/2001 | Kazmierczak | 310/261 |
| 6,252,318 B1 | * | 6/2001 | Kazmierczak | 310/260 |
| 6,339,268 B1 | * | 1/2002 | Kaminski et al. | 310/61 |
| 6,339,269 B1 | * | 1/2002 | Hsiao | 310/60 A |
| 6,362,545 B1 | * | 3/2002 | Prole et al. | 310/58 |
| 6,392,326 B1 | * | 5/2002 | Turnbull et al. | 310/270 |
| 6,417,586 B1 | * | 7/2002 | Jarczynski et al. | 310/61 |

OTHER PUBLICATIONS

Chyu, M.K.; Yu, H.; et al. "Concavity enhanced heat transfer in an internal cooling passage", Paper No. 437. American Society of Mechanical Engineers Proceedings of the 1997 International Gas Turbine and Aeroengine congress and Exhibition, Orlando, Florida, Jun. 2–5, 1997.
U.S. Application Ser. No. 09/739,358 filed Dec. 19, 2000.
U.S. Application Ser. No. 09/739,359 filed Dec. 19, 2000.
U.S. Application Ser. No. 09/741,896 filed Dec. 22, 2000.

* cited by examiner

Primary Examiner—Nestor Ramirez
Assistant Examiner—Pedro Cuevas
(74) Attorney, Agent, or Firm—Nixon & Vanderhye PC

(57) ABSTRACT

A gas cooled dynamoelectric machine is provided that is comprised of a rotor, a rotor winding comprising axially extending coils and concentric endwindings, and a plurality of spaceblocks located between adjacent endwindings thereby to define a plurality of cavities, each bounded by adjacent spaceblocks and adjacent endwindings. To enhance the heat transfer rate from the copper end turns of the field endwinding region, cavity facing surface(s) of the endwinding and/or the spaceblock have a non-planar surface profile to increase surface area, improve turbulent mixing on the surface, and/or provide boundary layer breakup.

21 Claims, 9 Drawing Sheets

GENERATOR ENDWINDING COOLING ENHANCEMENT

BACKGROUND OF THE INVENTION

The present invention relates to a structure for enhancing cooling of generator rotors through surface profiling of the copper end turns and/or spaceblocks.

The power output rating of dynamoelectric machines, such as large turbo-generators, is often limited by the ability to provide additional current through the rotor field winding because of temperature limitations imposed on the electrical conductor insulation. Therefore, effective cooling of the rotor winding contributes directly to the output capability of the machine. This is especially true of the rotor end region, where direct, forced cooling is difficult and expensive due to the typical construction of these machines. As prevailing market trends require higher efficiency and higher reliability in lower cost, higher-power density generators, cooling the rotor end region becomes a limiting factor.

Turbo-generator rotors typically consist of concentric rectangular coils mounted in slots in a rotor. The end portions of the coils (commonly referred to as endwindings), which are beyond the support of the main rotor body, are typically supported against rotational forces by a retaining ring (see FIG. 1). Support blocks are placed intermittently between the concentric coil endwindings to maintain relative position and to add mechanical stability for axial loads, such as thermal loads (see FIG. 2). Additionally, the copper coils are constrained radially by the retaining ring on their outer radius, which counteracts centrifugal forces. The presence of the spaceblocks and retaining ring results in a number of coolant regions exposed to the copper coils. The primary coolant path is axial between the spindle and the bottom of the endwindings. Also, discrete cavities are formed between coils by the bounding surfaces of the coils, blocks and the inner surface of the retaining ring structure. The endwindings are exposed to coolant that is driven by rotational forces from radially below the endwindings into these cavities (see FIG. 3). This heat transfer tends to be low. This is because according to computed flow pathlines in a single rotating end winding cavity from a computational fluid dynamic analysis, the coolant flow enters the cavity, traverses through a primary circulation and exits the cavity. Typically, the circulation results in low heat transfer coefficients especially near the center of the cavity. Thus, while this is a means for heat removal in the endwindings, it is relatively inefficient.

Various schemes have been used to route additional cooling gas through the rotor end region. All of these cooling schemes rely on either (1) making cooling passages directly in the copper conductors by machining grooves or forming channels in the conductors, and then pumping the gas to some other region of the machine, and/or (2) creating regions of relatively higher and lower pressures with the addition of baffles, flow channels and pumping elements to force the cooling gas to pass over the conductor surfaces.

Some systems penetrate the highly stressed rotor retaining ring with radial holes to allow cooling gas to be pumped directly alongside the rotor endwindings and discharged into the air gap, although such systems can have only limited usefulness due to the high mechanical stress and fatigue life considerations relating to the retaining ring.

If the conventional forced rotor end cooling schemes are used, considerable complexity and cost are added to rotor construction. For example, directly cooled conductors must be machined or fabricated to form the cooling passages. In addition, an exit manifold must be provided to discharge the gas somewhere in the rotor. The forced cooling schemes require the rotor end region to be divided into separate pressure zones, with the addition of numerous baffles, flow channels and pumping elements which again add complexity and cost.

If none of these forced or direct cooling schemes are used, then the rotor endwindings are cooled passively. Passive cooling relies on the centrifugal and rotational forces of the rotor to circulate gas in the blind, deadend cavities formed between concentric rotor windings. Passive cooling of rotor endwindings is sometimes also called "free convection" cooling.

Passive cooling provides the advantage of minimum complexity and cost, although heat removal capability is diminished when compared with the active systems of direct and forced cooling. Any cooling gas entering the cavities between concentric rotor windings must exit through the same opening since these cavities are otherwise enclosed—the four "side walls" of a typical cavity are formed by the concentric conductors and the insulating blocks that separate them, with the "bottom" (radially outward) wall formed by the retaining ring that supports the endwindings against rotation. Cooling gas enters from the annular space between the conductors and the rotor spindle. Heat removal is thus limited by the low circulation velocity of the gas in the cavity and the limited amount of the gas that can enter and leave these spaces.

In typical configurations, the cooling gas in the end region has not yet been fully accelerated to rotor speed, that is, the cooling gas is rotating at part rotor speed. As the fluid is driven into a cavity by means of the relative velocity impact between the rotor and the fluid, the heat transfer coefficient is typically highest near the spaceblock that is downstream relative to the flow direction—where the fluid enters with high momentum and where the fluid coolant is coldest. The heat transfer coefficient is also typically high around the cavity periphery. The center of the cavity receives the least cooling.

Increasing the heat removal capability of passive cooling systems will increase the current carrying capability of the rotor providing increased rating capability of the generator whole maintaining the advantage of low cost, simple and reliable construction.

U.S. Pat. No. 5,644,179, the disclosure of which is incorporated by reference, describes a method for augmenting heat transfer by increasing the flow velocity of the large single flow circulation cell by introducing additional cooling flow directly into, and in the same direction as, the naturally occurring flow cell. While this method increases the heat transfer in the cavity by augmenting the strength of the circulation cell, the center region of the rotor cavity was still left with low velocity and therefore low heat transfer. The same low heat transfer still persists in the corner regions.

SUMMARY OF THE INVENTION

The invention enhances the heat transfer rate from the copper end turns of the field endwinding region by using surface machining or preparation to generate flow structures beneficial to cooling of the end turns. Improving cooling of the end turns in this region will provide the opportunity to increase the power output rating of a given machine leading to an improved cost basis on a dollar per kilowatt-hour basis. As the endwinding region is usually limiting in terms of satisfying maximum temperature constraints, improvements in this region should produce significant performance benefits.

Heat transfer rates are increased by the increased surface area, improved turbulent mixing on the surface, and boundary layer breakup and subsequent reattachment. According to a first embodiment of the invention, at least one of the copper end turns is machined to increase the surface area thereof as compared to a planar surface. This may be accomplished by roughening the surface such as for example, by creating grooves.

According to a second, alternate embodiment of the invention, the surface area of the end turns is increased by forming small dimples, similar to those provided on the surface of golf balls, on the rotor copper end turn sections. These dimples increase heat transfer rates by a factor of three or four while causing a negligible increase in the friction characteristics and overall pressure loss.

In accordance with a further feature of the invention, in addition to or rather than modifying the copper end turns themselves, the support blocks or spaceblocks disposed between the copper end turns are modified. According to one exemplary embodiment, turbulators are placed on the spaceblock face disposed on the downstream side of the cavity. More specifically, each of the rotor spaceblocks is fabricated with roughness elements. These turbulators act to disturb the flow, leading to increased turbulence and incoherent mixing. The result is to improve the overall heat transfer rate.

In another alternate embodiment, vortex generators are formed on the spaceblock face on the downstream side of the cavity. More specifically, for example, triangular sections are fabricated onto the spaceblock for the purpose of generating coherent vortex structures from the cooling gas flow across the spaceblocks.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
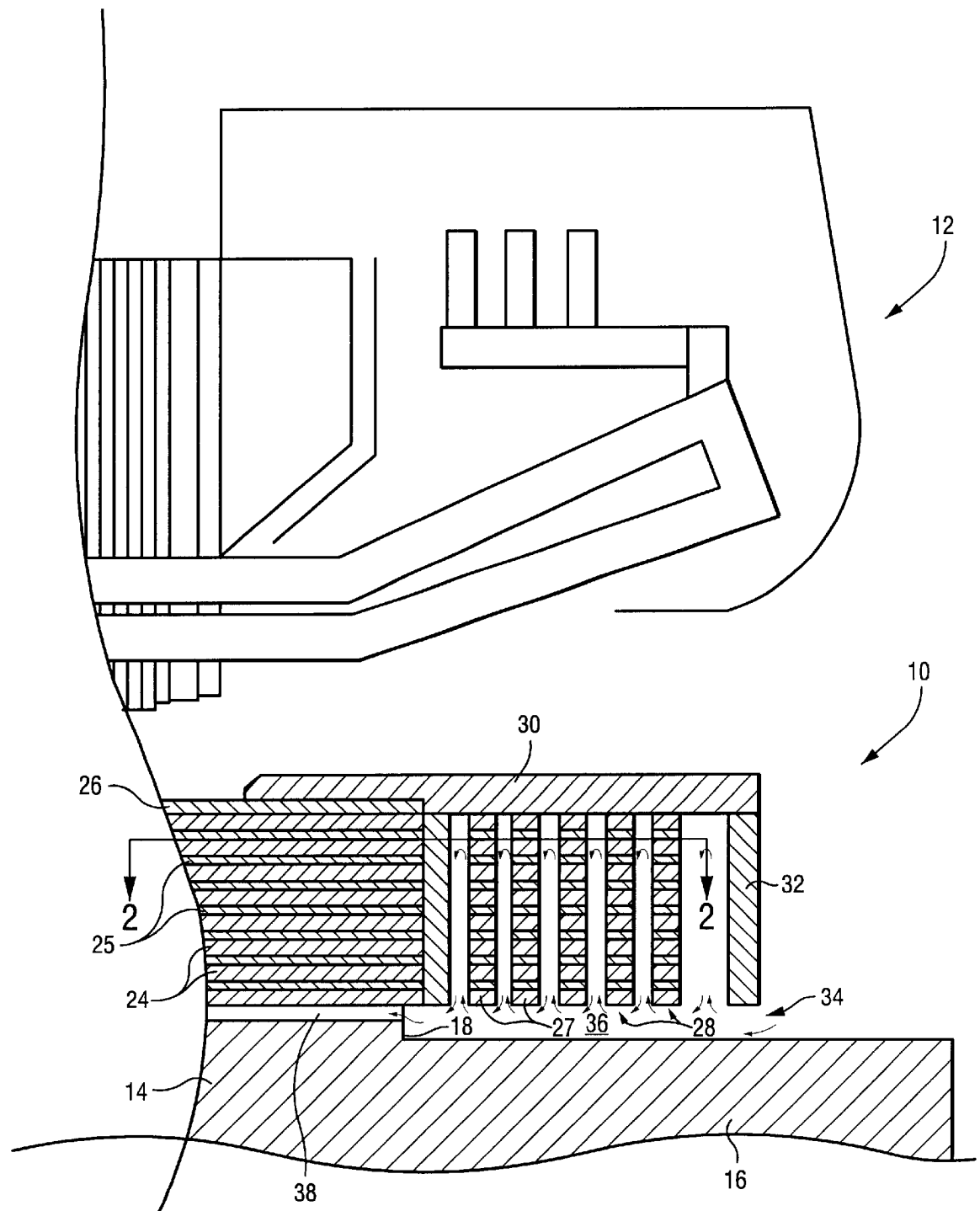
FIG. 1 is a cross-sectional view of a portion of the end turn region of a dynamoelectric machine rotor with a stator in opposed facing relation thereto.
Figure 2:
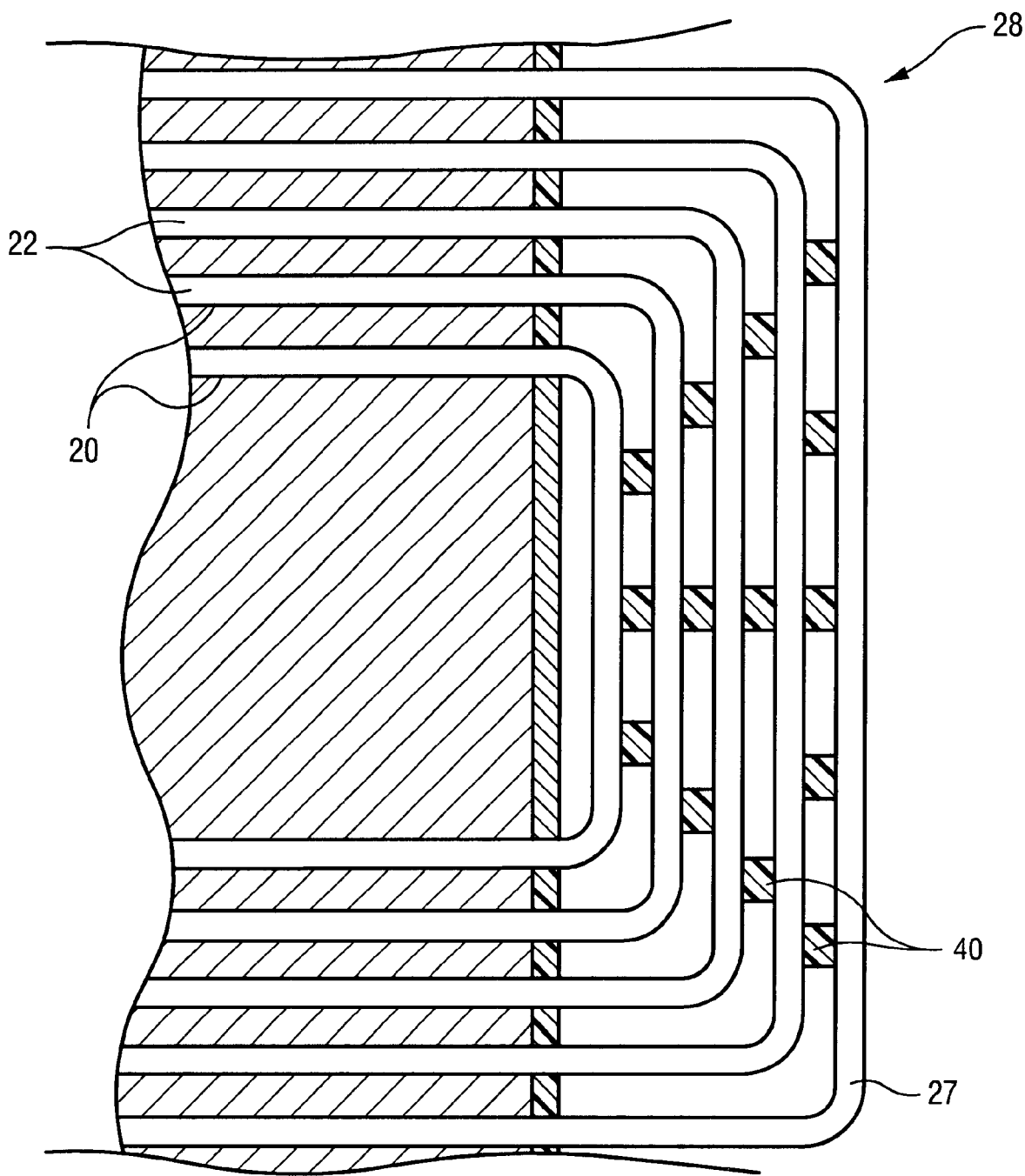
FIG. 2 is a cross-sectional top view of the dynamoelectric machine rotor taken along line 2—2 of FIG. 1.

Referring to the drawings wherein identical reference numerals denote the same elements throughout the various views, FIGS. 1 and 2 show a rotor 10 for a gas-cooled dynamoelectric machine, which also includes a stator 12 surrounding the rotor. The rotor includes a generally cylindrical body portion 14 centrally disposed on a rotor spindle 16 and having axially opposing end faces, of which a portion 18 of one end face is shown in FIG. 1. The body portion is provided with a plurality of circumferentially-spaced, axially extending slots 20 for receiving concentrically arranged coils 22, which make up the rotor winding. For clarity, only five rotor coils are shown in FIG. 2, although several more are commonly used in practice.

Specifically, a number of conductor bars 24 constituting a portion of the rotor winding are stacked in each one of the slots. Adjacent conductor bars are separated by layers of electrical insulation 25. The stacked conductor bars are typically maintained in the slots by wedges 26 (FIG. 1) and are made of a conductive material such as copper. The conductor bars 24 are interconnected at each opposing end of the body portion by end turns 27, which extend axially beyond the end faces to form stacked endwindings 28. The end turns are also separated by layers of electrical insulation.

Referring specifically to FIG. 1, a retaining ring 30 is disposed around the end turns at each end of the body portion to hold the endwindings in place against centrifugal forces. The retaining ring is fixed at one end to the body portion and extends out over the rotor spindle 16. A centering ring 32 is attached to the distal end of the retaining ring 30. It should be noted that the retaining ring 30 and the center ring 32 can be mounted in other ways, as is known in the art. The inner peripheral edge of the centering ring 32 is radially spaced from the rotor spindle 16 so as to form a gas inlet passage 34 and the endwindings 28 are spaced from the spindle 16 so as to define an annular region 36. A number of axial cooling channels 38 formed along slots 20 are provided in fluid communication with the gas inlet passage 34 via the annular region 36 to deliver cooling gas to the coils 22.

Figure 3:
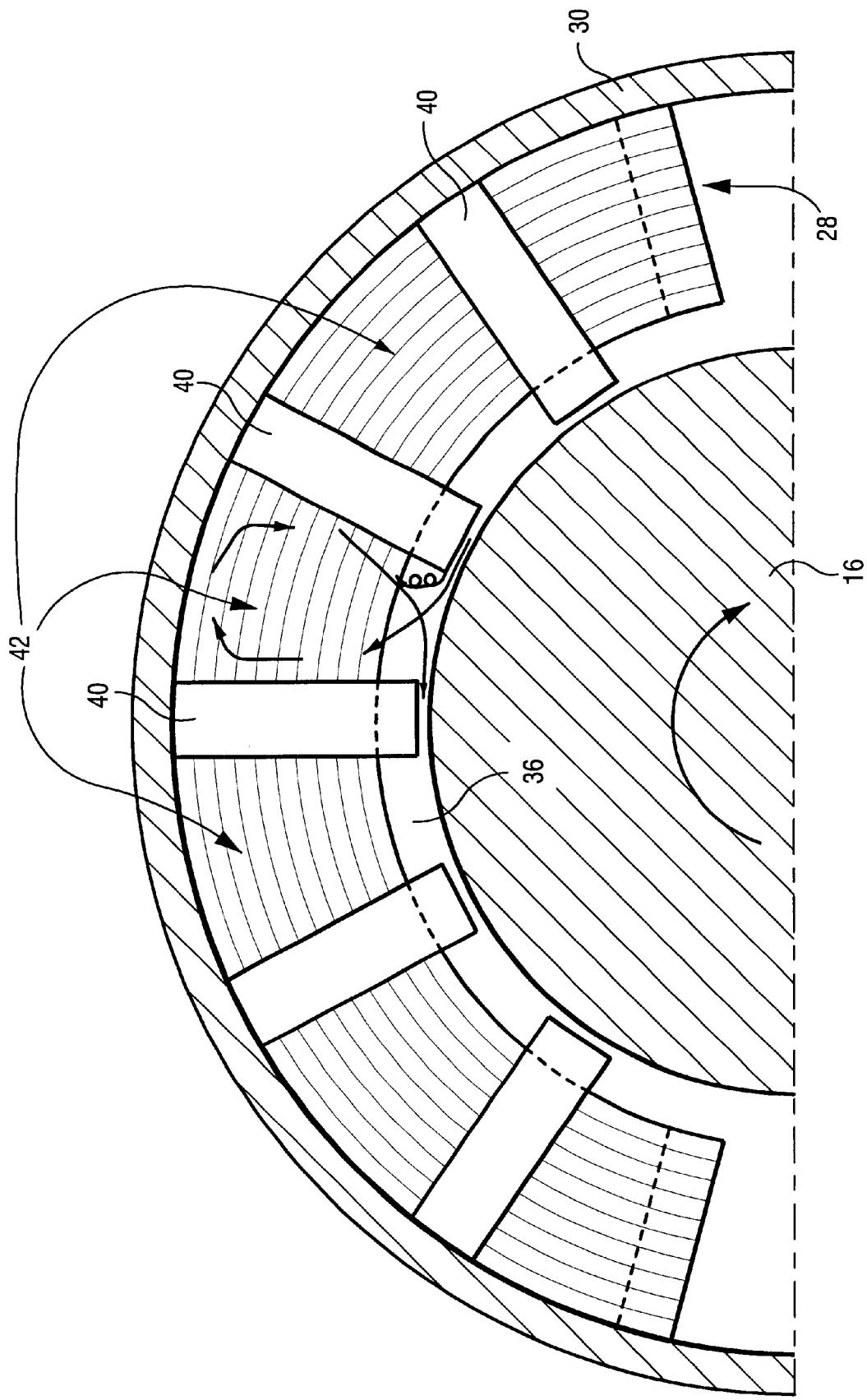
FIG. 3 is a schematic illustration showing passive gas flow into and through endwinding cavities.

Turning to FIG. 2, the endwindings 28 at each end of the rotor 10 are circumferentially and axially separated by a number of spacers or spaceblocks 40. (For clarity of illustration, the spaceblocks are not shown in FIG. 1). The spaceblocks are elongated blocks of an insulating material located in the spaces between adjacent endwindings 28 and extend beyond the full radial depth of the endwindings into the annular gap 36. Accordingly, the spaces between the concentric stacks of the end turns 27 are divided into cavities. These cavities are bounded on the top by the retaining ring 30 and on four sides by adjacent endwindings 28 and adjacent spaceblocks 40, as shown in FIG. 3. As best seen in FIG. 1, each of these cavities is in fluid communication with the gas inlet passage 34 via the annular region 36. A portion of the cooling gas entering the annular region 36 between the endwinding 28 and the rotor spindle 16 through the gas inlet passage 34 thus enters cavities 42, circulates therein, and then returns to the annular region 36 between the endwinding and the rotor spindle. Air flow is shown by the arrows in FIGS. 1 and 3.

The inherent pumping action and rotational forces acting in a rotating generator cavity produce a large single flow circulation cell, as schematically shown in FIG. 3. This flow circulation cell exhibits its highest velocity near the peripheral edges of the cavity, typically leaving the center region inadequately cooled due to the inherently low velocity in the center region of the cavity. As can be seen from FIG. 3, large areas of the corner regions are also inadequately cooled because the circular motion of the flow cell does not carry cooling flow into the corners.

To improve generator field end winding cooling effectiveness, in an embodiment of the invention the copper end turn sections and/or mechanical spaceblocks are machined or otherwise surface profiled so as to define a non-planar surface profile on a surface thereof facing the adjacent endwinding cavity. These surface modifications increase the level of turbulent mixing and breaking up the thermal boundary layers developed by the flow moving along the surfaces. In each case, the corresponding pressure drop will increase. However, the gains in cooling the endwinding region generally produce overall benefits that are in excess of the penalty of increased windage loss.

Figure 4:
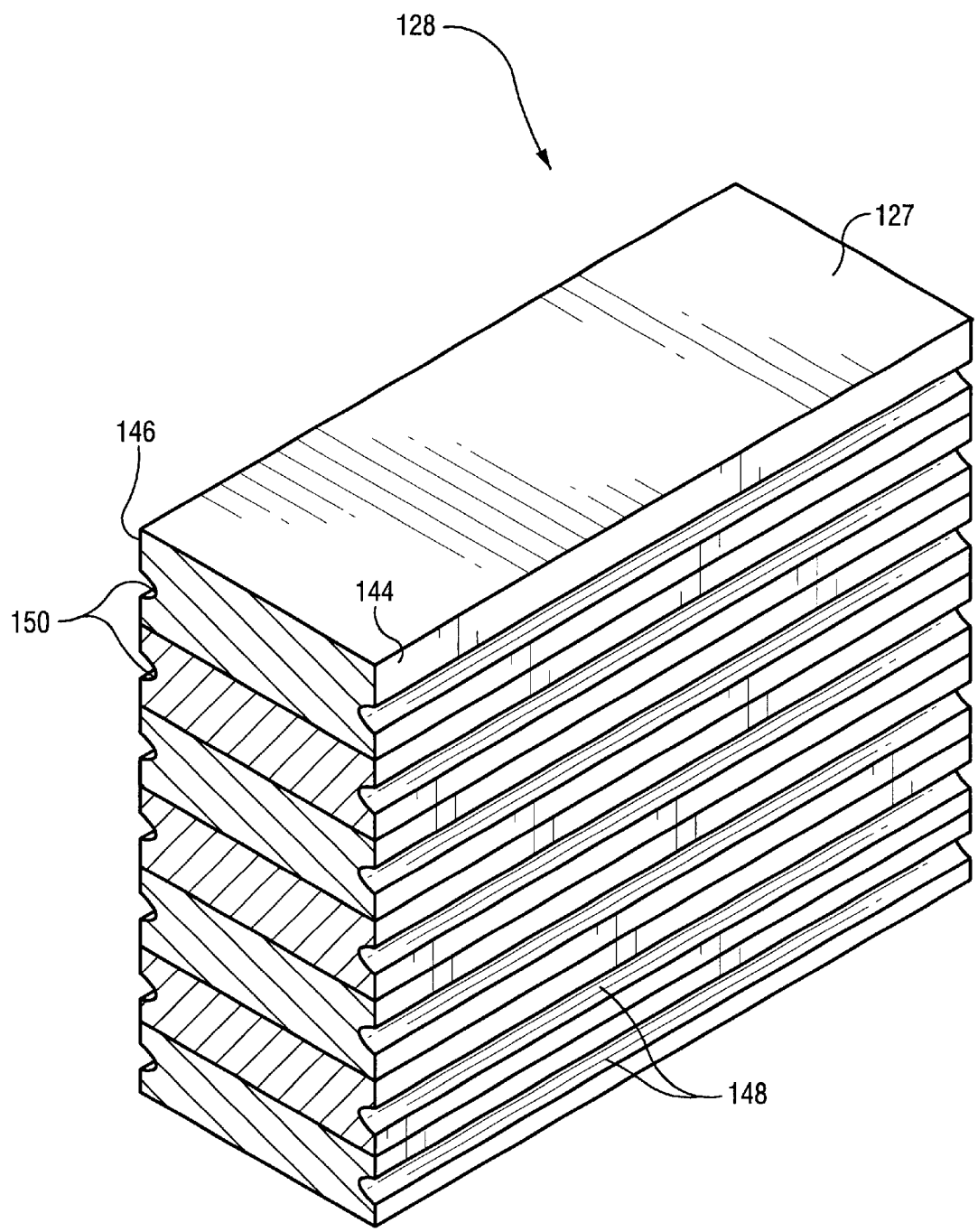
FIG. 4 is a partial perspective view illustrating copper end turns with extruded grooves to increase surface area according to an embodiment of the invention.

Thus, referring to FIG. 4, the surface(s) of at least one of the end turns 127 bounding the cooling cavity are at least one of machined or surface profiled so as to at least one of increased the surface area thereof and generate a turbulent flow to thereby improve heat transfer.

In accordance with a first embodiment, the exposed surfaces 144, 146 of the end turns 127 defining the endwinding 128 are extruded or machined to increase the surface area thereof. By way of example, the surface area can be increased by machining or extruding the copper turns to define at least one groove 148, 150 extending longitudinally of at least one exposed surface 144, 146 of the end turn(s) 127.

Figure 5:
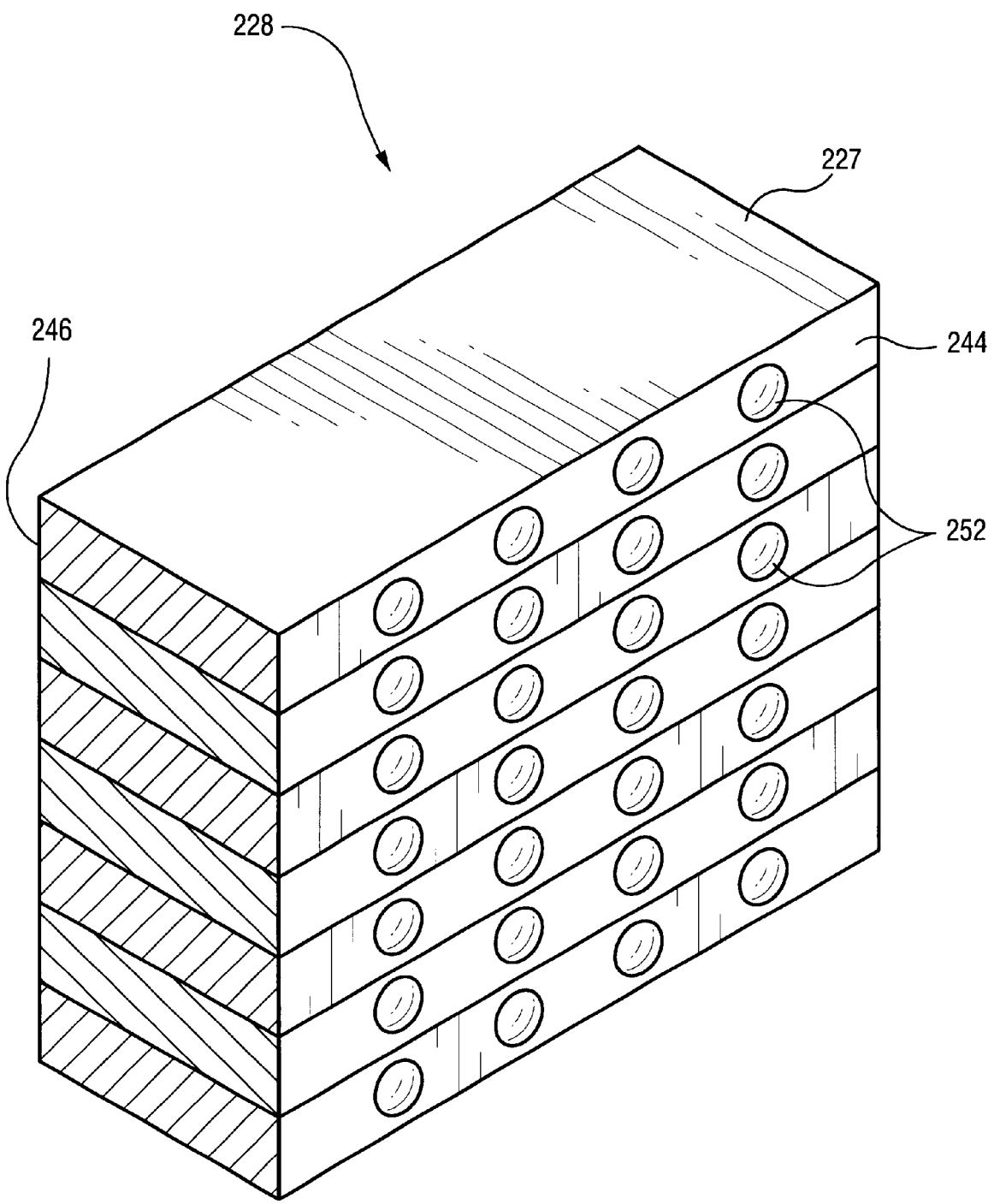
FIG. 5 is a partial perspective view showing turns with dimples to increase surface area according to an alternate embodiment of the invention.
Figure 6:
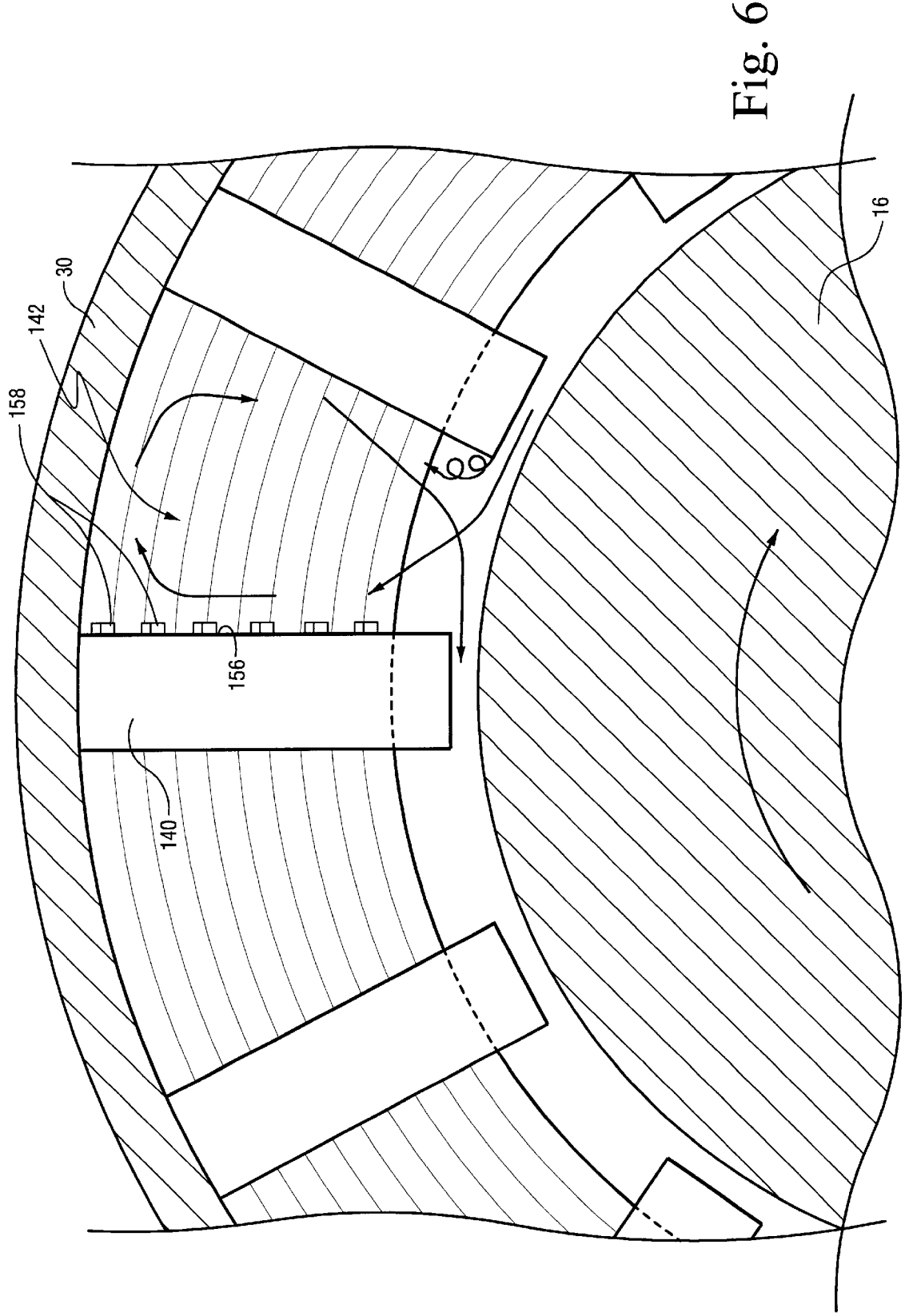
FIG. 6 illustrates turbulators provided on the downstream spaceblock face in an embodiment of the invention.

In an alternate embodiment, as illustrated in FIG. 5, a plurality of dimples 252 are formed in at least one surface 244, 246 of at least one of the copper end turns 227 defining the rotor endwinding 228.

It is to be understood that the grooving and dimpling embodiments are merely examples of surface profiling that may be adopted to improve heat transfer. Indeed, other surface profiling techniques for increasing surface area, improving turbulent mixing on the surface, and/or boundary layer breakup and subsequent reattachment may be adopted without departing from this invention. For example, protrusions or recesses of other shapes and patterns may be provided. Also, the surface profiling need not be as pronounced as the illustrated embodiment. Thus, for example, a knurled surface may be provided as a further alternative.

Figure 7:
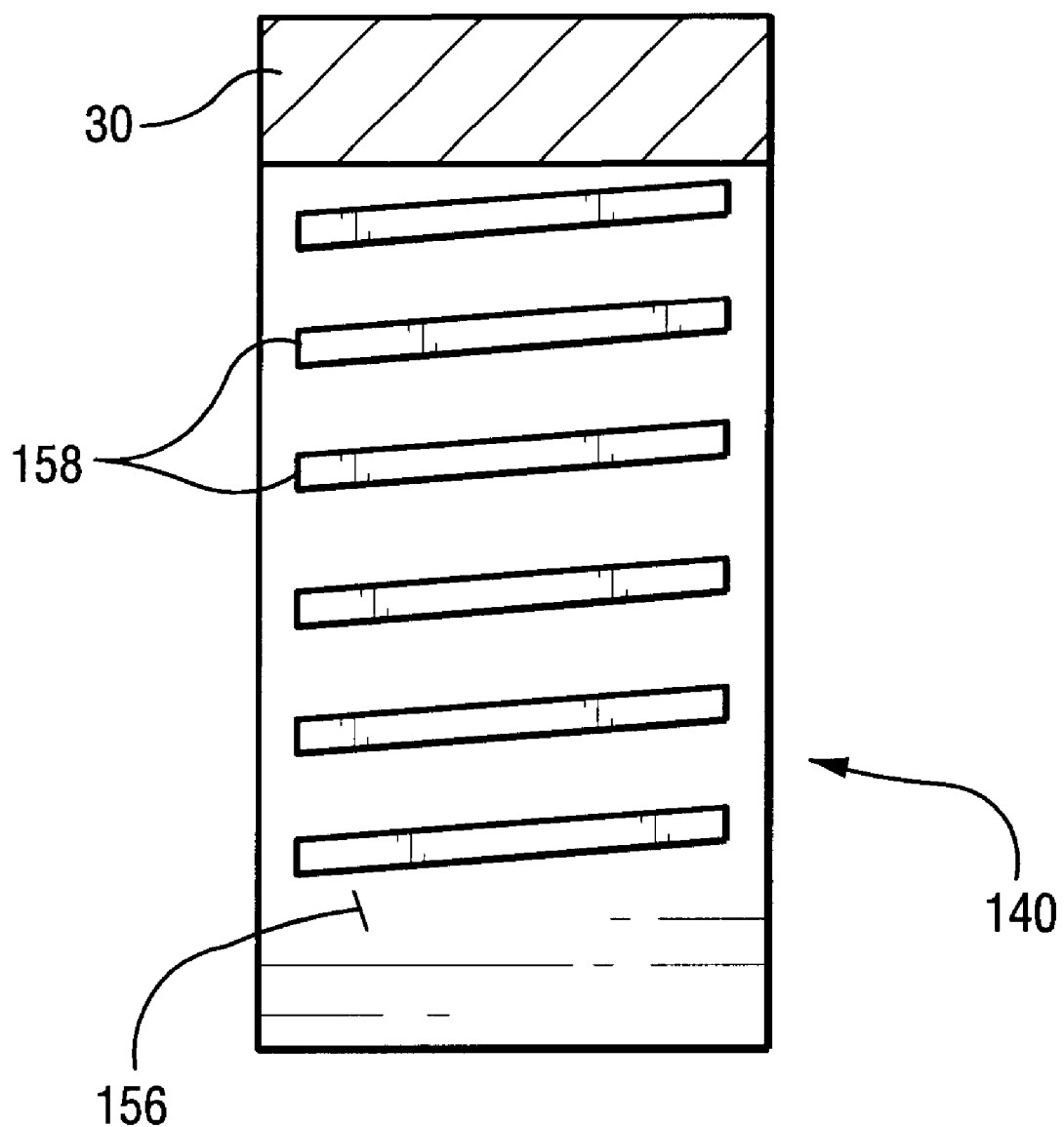
FIG. 7 is an elevational view of the turbulators provided in the FIG. 6 embodiment.

In accordance with a further aspect of the invention, as illustrated in FIGS. 6-9, in addition to or as an alternative to surface profiling the end turns, at least the surface 156 disposed on the downstream side of the respective cavity 142 (hereinafter referred to as downstream surface) of at least some of the spaceblocks 140 is profiled so as to redirect flow impinged thereon. In a presently preferred embodiment, the downstream surface of the spaceblock is profiled by providing at least one flow disrupting structure thereon. In one example, the flow disrupting structures are turbulators 158 provided on the downstream surface of the spaceblocks (only one turbulated spaceblock is shown for clarity). Each of the turbulators 158 has a generally rectangular and most preferably square shape in vertical section (FIG. 6) and have a longitudinal axis inclined with respect to an axis of the rotor (FIG. 7). As noted above, the turbulators may be provided on the spaceblocks instead of or in addition to the surface machining or profiling exemplified by FIGS. 4-5.

Figure 8:
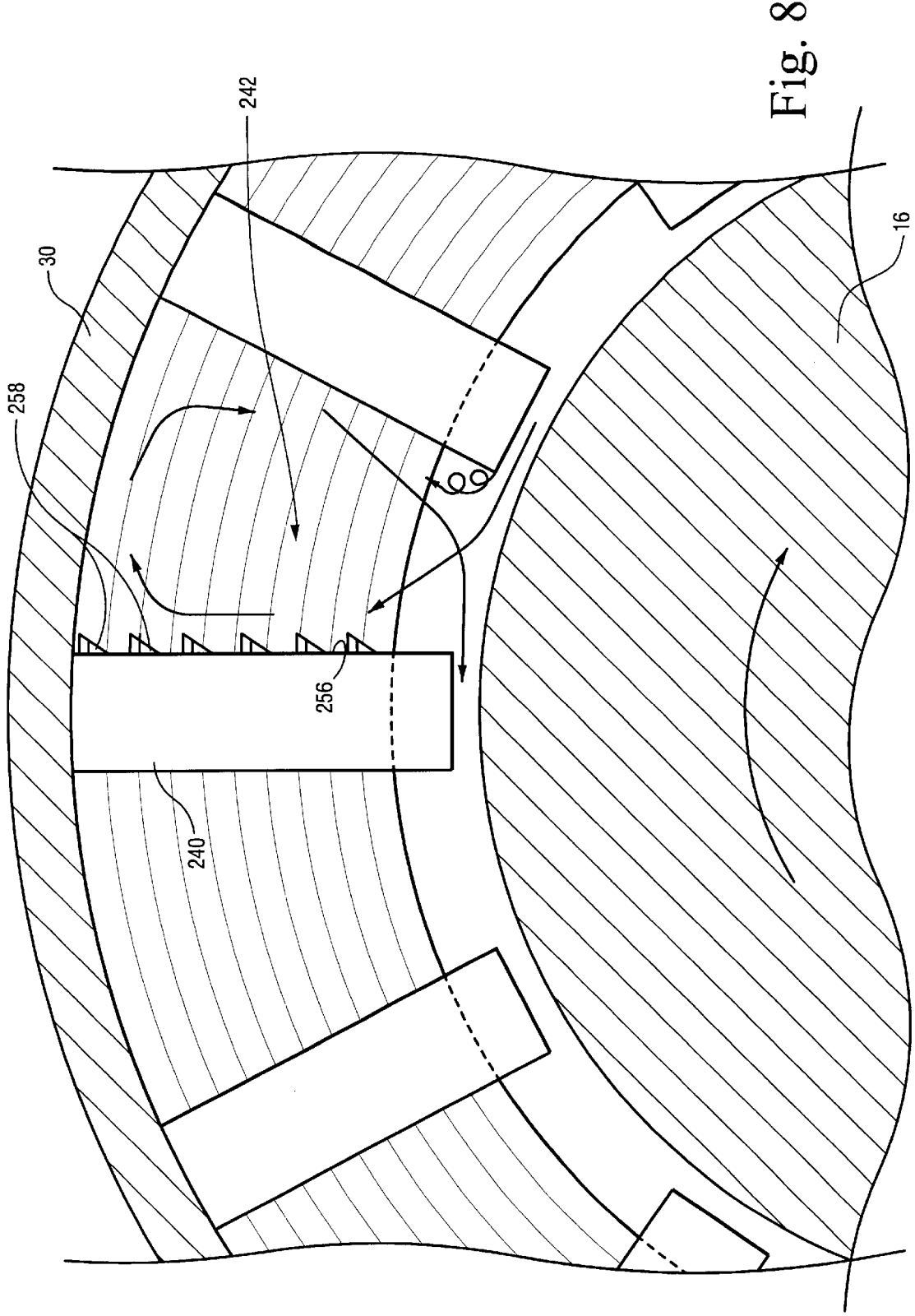
FIG. 8 is a cross sectional view of the end turn region showing vortex generators on the downstream spaceblock face.
Figure 9:
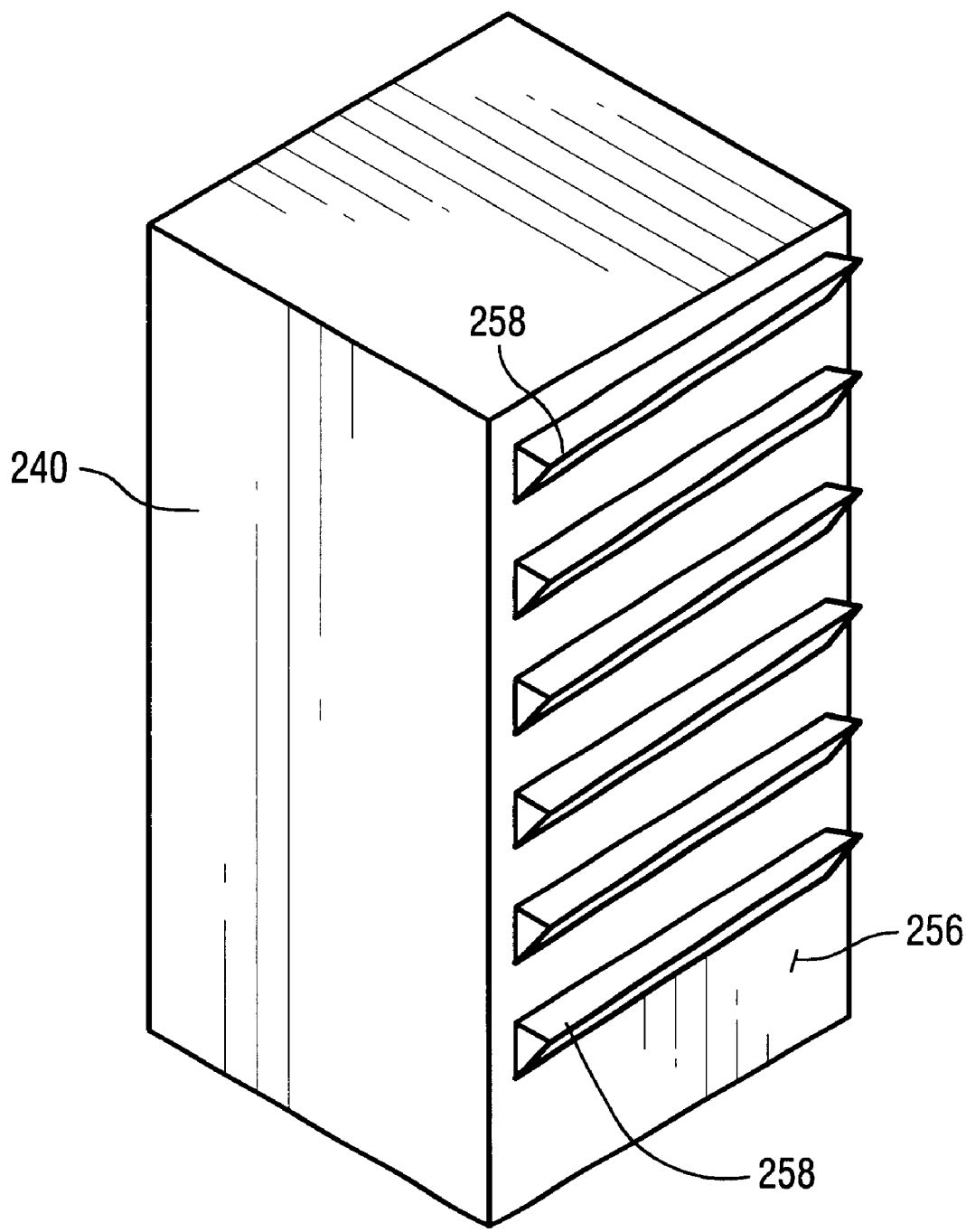
FIG. 9 is a perspective view of a spaceblock of the FIG. 8 embodiment.

According to another alternate example, the flow disrupting structures are a plurality of vortex generators 258 provided on the surface 256 at least some of the spaceblocks 240 that faces and is disposed on the downstream side of the respective cavity 242. As shown in FIG. 8, each of the vortex generators 258 has a generally triangular vertical cross-section and as shown in FIG. 9, each vortex generator 258 is oriented with its longitudinal axis at an incline with respect to the axis of the rotor 10.

While the invention has been described in connection with what is presently considered to be the most practical and preferred embodiment, it is to be understood that the invention is not to be limited to the disclosed embodiments, but on the contrary, is intended to cover various modifications and equivalent arrangements included within the spirit and scope of the appended claims.

What is claimed is:

1. A gas cooled dynamoelectric machine, comprising:
   a rotor having a body portion, said rotor having axially extending coils and end turns defining a plurality of endwindings extending axially beyond at least one end of said body portion; and
   at least one spaceblock located between adjacent said endwindings so as to define a cavity therebetween,
   wherein at least one said end turn has a non-planar surface profile on a surface thereof facing said cavity, said non-planar surface profile comprising at least one protrusion or recess integrally defined on said surface of said at least one end turn for increasing turbulent mixing and/or boundary layer breakup on said surface thereby to increase heat transfer.

2. The dynamoelectric machine of claim 1, wherein said surface has at least one groove defined therein.

3. The dynamoelectric machine of claim 1, wherein said surface has at least one dimple defined therein.

4. The dynamoelectric machine of claim 1, wherein a plurality of the end turns defining each said endwinding have non-planar surface profiles.

5. A gas cooled dynamoelectric machine, comprising:
   a rotor having a body portion, said rotor having axially extending coils and end turns defining a plurality of endwindings extending axially beyond at least one end of said body portion; and
   at least one spaceblock located between adjacent said endwindings so as to define a cavity therebetween,
   wherein at least one said end turn has a non-planar surface profile on a surface thereof facing said cavity, and
   wherein said spaceblock has a non-planar surface profile on a surface thereof facing said cavity.

6. The dynamoelectric machine of claim 5, wherein said spaceblock surface has at least one flow disrupting structure disposed thereon.

7. The dynamoelectric machine of claim 6, wherein said flow disrupting structure comprises a turbulator structure that is generally rectangular in vertical cross-section.

8. The dynamoelectric machine of claim 7, wherein said turbulator structure is disposed with a longitudinal axis thereof disposed at an angle of greater than zero degrees with respect to an axis of said rotor.

9. The dynamoelectric machine of claim 6, wherein said flow disrupting structure comprises a vortex generating structure that is generally triangular in vertical cross-section.

10. The dynamoelectric machine of claim 9, wherein said vortex generating structure is disposed with a longitudinal axis thereof disposed at an angle of greater than zero degrees with respect to an axis of said rotor.

11. The dynamoelectric machine of claim 6, wherein said flow disrupting structure is disposed on a circumferentially oriented surface of said spaceblock.

12. A gas cooled dynamoelectric machine, comprising:
   a rotor having a spindle and a body portion;
   a rotor winding comprising axially extending coils disposed on said body portion and spaced, concentric endwindings extending axially beyond at least one end of said body portion, said endwindings and said spindle defining an annular space therebetween; and a plurality of spaceblocks located between adjacent ones of said endwindings thereby to define a plurality of cavities, each bounded by adjacent spaceblocks and adjacent endwindings and open to said annular space;

wherein a cavity facing surface of at least one said endwinding has a non-planar surface profile, said non-planar surface profile comprising at least one protrusion or recess integrally defined on said surface of said at least one endwinding for increasing turbulent mixing and/or boundary layer breakup on said surface, thereby increase heat transfer.

13. The dynamoelectric machine of claim 12, wherein at least one cavity facing surface of each of a plurality of said endwindings has at least one groove defined therein.

14. The dynamoelectric machine of claim 12, wherein at least one cavity facing surface of each of a plurality of said endwindings has at least one dimple defined therein.

15. A cooled dynamoelectric machine, comprising:

a rotor having a spindle and a body portion;

a rotor winding comprising axially extending coils disposed on said body portion and spaced, concentric endwindings extending axially beyond at least one end of said body portion, said endwindings and said spindle defining an annular space therebetween; and a plurality of spaceblocks located between adjacent ones of said endwindings thereby to define a plurality of cavities, each bounded by adjacent spaceblocks and adjacent endwindings and open to said annular space;

wherein at lease one cavity facing surface of each of a plurality of said spaceblocks has a non-planar surface profile.

16. The dynamoelectric machine of claim 15, wherein each said flow disrupting structure comprises a turbulator structure that is generally rectangular in vertical cross-section.

17. The dynamoelectric machine of claim 16, wherein said turbulator structure is disposed with a longitudinal axis thereof an angle of greater than zero degrees with respect to an axis of said rotor.

18. The dynamoelectric machine of claim 17, wherein each said flow disrupting structure comprises a vortex generating structure that is generally triangular in vertical cross-section.

19. The dynamoelectric machine of claim 18, wherein said vortex generating structure is disposed with a longitudinal axis thereof disposed at an angle of greater than zero degrees with respect to an axis of said rotor.

20. The dynamoelectric machine of claim 15, wherein said at least one flow disrupting structure is disposed on a circumferentially oriented surface of said spaceblock on a downstream side of said respective cavity.

21. A gas cooled dynamoelectric machine, comprising:

a rotor having a body portion, said rotor having axially extending coils and end turns defining a plurality of endwindings extending axially beyond at least one end of said body portion; and at least one spaceblock located between adjacent said endwindings so as to define a cavity therebetween, wherein at least one said end turn has a non-planar surface profile on a surface thereof facing said cavity, wherein said surface has at least one dimple defined therein.

* * * * *